Oct. 10, 1933.   F. AESCHBACH   1,929,864
MEAT CHOPPING MACHINE
Filed Nov. 9, 1931
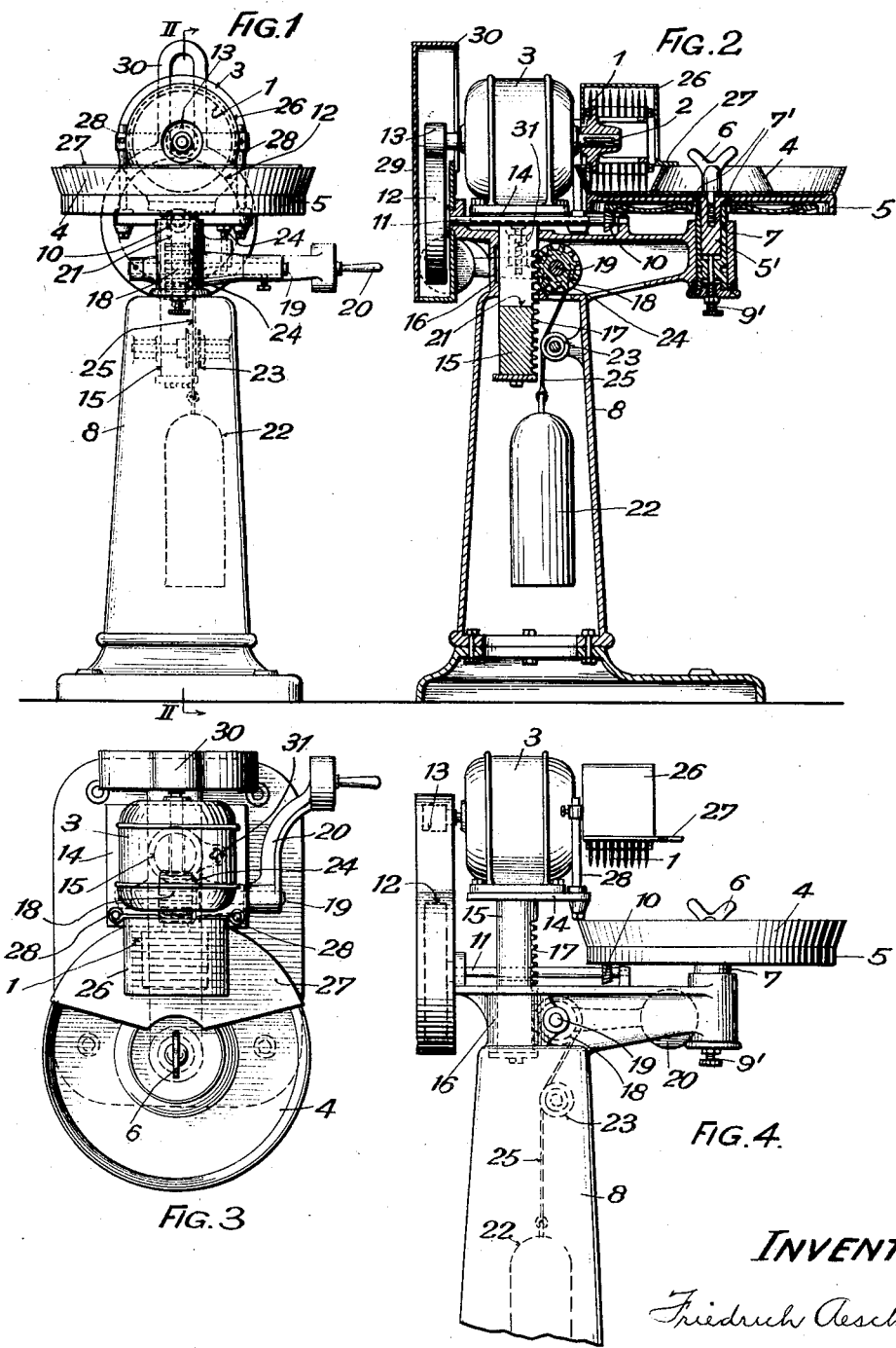
INVENTOR:
Friedrich Aeschbach
By Sommers & Young
Attys.

Patented Oct. 10, 1933

1,929,864

UNITED STATES PATENT OFFICE 1,929,864

MEAT CHOPPING MACHINE

Friedrich Aeschbach, Aarau, Switzerland

Application November 9, 1931, Serial No. 573,978, and in Switzerland November 11, 1930, and Germany November 11, 1930

3 Claims. (Cl. 146—67)

This invention relates to meat chopping machines including a plurality of circular knives arranged on a power driven shaft and a rotatable receptacle for the reception of the meat. With the known machines of this type the knives remain at all times in their working positions in the receptacle for the meat which arrangement renders the removal of the chopped meat difficult, the operator being obliged to extricate the same by means of an implement.

This disadvantage is obviated in the meat chopping machine according to the present invention by arranging the knives in overhanging disposition on the motor shaft and adapting the motor to be lifted together with the knives so that the knives clear the receptacle which is detachably connected to its support.

In the accompanying drawing a constructional form of the invention is illustrated, by way of example only, in which Fig. 1 shows a front elevation of the machine, Fig. 2 is a vertical section on the line II—II in Fig. 1, Fig. 3 is a top plan view of the machine, and Fig. 4 is a side elevation of the machine showing the motor in a raised position.

On the forward overhanging end of the shaft 2 of the motor 3 a number of circular knife blades 1 are arranged. The knives 1 cooperate with a circular receptacle 4 for chopping the meat, the receptacle being detachably connected to its supporting member 5 by means of a thumb nut 6. The supporting member 5 is axially displaceably accommodated in a sleeve 7 by means of a pin 5' which is prevented from turning in the sleeve by stop members, as studs 7'. The sleeve 7 is rotatably mounted in the frame 8 of the machine and forms the hub of a bevel gear wheel having a toothed rim 9 which meshes with a bevel gear wheel 10 secured to a shaft 11. By means of this bevel gear drive the receptacle 4 is imparted a turning motion from the motor. The vertical position of the supporting member 5 and thus that of the receptacle 4 is adjustable by means of the screw 9'. The shaft 11 is actuated by the motor 3 by the intermediary of a friction drive including the friction wheels 12 and 13. The motor 3 is supported by a base 14 which is provided with a downwardly projecting stem or shank 15 which is guided in a sleeve 16 of the machine frame 8. The shank is provided with gear teeth 17 for cooperation with a pinion 18, the two parts forming a rack gear. The pinion 18 is secured to a shaft 19 which is adapted to be rotated by means of a hand crank 20. By turning the hand crank 20, the shank 15, the base 14, the motor 3 and the knives 1 are raised in unison into the position shown in Fig. 4, whereby the knives are moved beyond the receptacle 4. In order to avoid that in rising the shank 15 interfere with the shaft 11, the former is provided with a slot 21 for receiving the shaft 11. For facilitating the lifting of the shank a counter-weight 22 is provided which is attached to the latter by a flexible member such as a wire rope 25 passing over guide rollers 23, 24.

The knives 1 are protected by a guard cap 26 provided with a broadened flange 27 which in the lowered position of the cap shields a portion of the receptacle 4 adjoining the knives. The guard cap 26 is adjustably connected to two vertical posts 28 by means of sockets surrounding the posts and provided with thumb screws. The posts 28 in turn are connected to the base to project upwardly therefrom, so that by means of the thumb screws the guard cap is adjustable in height relatively to the knives. In this manner the cap moves together with the base 14 and the knives 1, when these parts are raised, so that the knives are protected by the guard cap in all positions of the same. The adjustable connection between the posts and the cap is necessary for preventing the flange 27 from bearing on the receptacle when, as for reasons hereinafter explained, the diameter of the knives is changed and the distance between the knives and the bottom of the receptacle readjusted.

The protective casing 29 for the friction gear drive 12, 13 is provided with an upper extension 30 in which the wheel 13 during the raising operation travels. The screw 31 serves as an abutment for the base 14, when this screw bears against the base in the lowermost position of the latter. This position is so regulated by means of the screw 31 that the wheels 12, 13 of the friction drive are urged against each other with just sufficient pressure for producing the exact amount of frictional engagement between these wheels assuring a dependable operation of the drive under all practical loads. In this manner the driving means of the receptacle are relieved from undue pressure. The distance of the knives 1 from the bottom of the receptacle 4 is accurately adjusted by means of the screw 9'. This adjustment is changed every time after the knives have been sharpened with consequent alterations in the diameter thereof and also in agreement with the readjustments of the screw 31 due to wear on the wheels 12, 13 or parts connected therewith. The cutter head constituted by the knives is adapted to act as a ventilator for preventing the meat from being heated during the chopping process by blowing a stream of cooling air thereagainst.

The described machine is particularly adapted for use in butcher shops and the like for chopping the meat in the presence of the customers. After the knives are raised and the dish-shaped receptacle 4 is detached from its support, the chopped meat is more conveniently removed from the dish than usual. Suitably at least two receptacles are provided for each machine, thus enabling keeping the one in readiness for substitution when the other is in use.

I claim,

1. In a motor driven meat chopping machine, in combination, a motor, a drive shaft of said motor, a plurality of circular knives mounted on the end of said motor shaft, a rotatable detachable receptacle for the meat, driving means directly actuated by said motor and operatively connected with said receptacle, means for vertically lifting said motor together with said knives to a position adapting said receptacle to be conveniently removed from under said knives, means cooperating with said lifting means for respacing said knives exactly to the same desired operative position relatively to said receptacle at all stages of wear of said driving means and said knives, a guard cap for said knives for protecting said knives in all positions of the same, and an adjustable connection provided between the base of said motor and said guard cap adapting the cap to be kept clear of said receptacle in all positions of adjustment of the receptacle.

2. In a motor driven meat chopping machine, in combination, a motor, a drive shaft of the motor, a base on said motor, a plurality of circular knives mounted on the end of said motor shaft, a rotatable, detachable receptacle for the meat, driving means directly actuated by said motor and operatively connected with said receptacle, a rack and gear drive connected to said base of said motor for lifting the latter together with said knives to a position adapting said receptacle to be conveniently removed from under said knives, an adjustable stop for said base for maintaining said driving means in exact working engagement at all stages of wear of said means and relieving said means from undue motor loading and for locking said rack and gear drive in position, and means for vertically adjusting said receptacle for maintaining the desired distance between said receptacle and said knives in their operative position and in all conditions of wear thereof at exactly the same length.

3. In a motor driven meat chopping machine, in combination, a motor, a drive shaft of said motor, a plurality of circular knives mounted on the end of said motor shaft, a rotatable, detachable receptacle for the meat, a friction drive directly actuated by said motor and operatively connected with said receptacle, means for vertically lifting said motor together with said knives to a position adapting said receptacle to be conveniently removed from under said knives, an adjustable stop for the base of said motor for maintaining the driving parts of said friction drive in exact working engagement in all conditions of wear of said parts and relieving said parts from undue motor loading, and means for vertically adjusting said receptacle for maintaining the desired distance between said receptacle and said knives in their operative position and at all stages of wear thereof at exactly the same length.

FRIEDRICH AESCHBACH.